(12) United States Patent  (10) Patent No.: US 8,724,301 B2
Mahmoud  (45) Date of Patent: May 13, 2014

(54) LAPTOP BOOK

(76) Inventor: Mohamed K. Mahmoud, Richardson, TX (US)

(*) Notice: Subject to any disclaimer, the term of this patent is extended or adjusted under 35 U.S.C. 154(b) by 745 days.

(21) Appl. No.: 12/636,679

(22) Filed: Jan. 29, 2010

(65) Prior Publication Data

US 2011/0187646 A1  Aug. 4, 2011

(51) Int. Cl.
  *G06F 1/16*  (2006.01)

(52) U.S. Cl.
  USPC .................. 361/679.04; 361/679.13; 345/901

(58) Field of Classification Search
  USPC ........................................ 361/679.13, 679.04
  See application file for complete search history.

(56) References Cited

U.S. PATENT DOCUMENTS

| | | | | |
|---|---|---|---|---|
| 5,808,862 | A  * | 9/1998 | Robbins | 361/679.09 |
| 6,229,502 | B1 * | 5/2001 | Schwab | 345/1.1 |
| 6,262,785 | B1 * | 7/2001 | Kim | 349/58 |
| 6,341,061 | B1 * | 1/2002 | Eisbach et al. | 361/679.46 |
| 6,700,773 | B1 * | 3/2004 | Adriaansen et al. | 361/679.08 |
| 6,747,635 | B2 * | 6/2004 | Ossia | 345/169 |
| 6,771,493 | B2 * | 8/2004 | Chen | 361/679.11 |
| 6,862,171 | B1 * | 3/2005 | Maskatia et al. | 361/679.06 |
| D511,162 | S  * | 11/2005 | Majumder | D14/345 |
| 7,342,776 | B1 * | 3/2008 | Chan | 361/679.27 |
| 7,352,565 | B2 * | 4/2008 | Yin | 361/679.55 |
| 7,385,811 | B2 * | 6/2008 | Kwong et al. | 361/679.48 |
| 7,453,437 | B2 * | 11/2008 | Inui | 345/156 |
| 7,489,503 | B2 * | 2/2009 | Maatta | 361/679.27 |
| 7,705,799 | B2 * | 4/2010 | Niwa | 345/1.1 |
| 7,783,986 | B2 * | 8/2010 | Barsness et al. | 715/776 |
| 8,208,249 | B2 * | 6/2012 | Chin et al. | 361/679.27 |
| 8,305,293 | B2 * | 11/2012 | Chu | 345/1.3 |
| 2002/0024499 | A1 * | 2/2002 | Karidis et al. | 345/156 |
| 2003/0026068 | A1 * | 2/2003 | Tsai et al. | 361/683 |
| 2003/0142469 | A1 * | 7/2003 | Ponx | 361/683 |
| 2004/0108968 | A1 * | 6/2004 | Finke-Anlauff | 345/1.1 |
| 2004/0136149 | A1 * | 7/2004 | Wang et al. | 361/680 |
| 2004/0233620 | A1 * | 11/2004 | Doczy et al. | 361/680 |
| 2006/0104013 | A1 * | 5/2006 | Sakakibara et al. | 361/680 |
| 2006/0126284 | A1 * | 6/2006 | Moscovitch | 361/681 |
| 2012/0162891 | A1 * | 6/2012 | Tranchina et al. | 361/679.26 |

* cited by examiner

*Primary Examiner* — Anthony Q Edwards
(74) *Attorney, Agent, or Firm* — Maqsood Ahmad

(57) ABSTRACT

The present invention provides a device and a method for a multi-screen laptop book by integrating a plurality of features including a tablet, an electronic book reader, and a notebook. The multi-screen display laptop book provides a capability in one simple and easy to use device. The integrated device utility includes applications for education, healthcare, industrial control, mobile point-of-sale, event self-registration, augmentative communication, personal computing and word processing, multimedia home use and home automation.

11 Claims, 7 Drawing Sheets

LAPTOP BOOK

CROSS-REFERENCE TO RELATED APPLICATIONS

Application Ser. No. 12/636,679.

STATEMENT REGARDING FEDERALLY SPONSORED RESEARCH OR DEVELOPMENT

Not applicable.

BACKGROUND

1. Technical Field

The present invention relates generally to the field of portable computers, such as notebook or laptop computers. This disclosure relates to mobile convenience and operational flexibility in the use of including education, healthcare, industrial control, mobile point-of-sale, event self-registration, augmentative communication, personal computing and word processing, multimedia home use and home automation. Still more particularly, the illustrative embodiments are directed to an integrated including a tablet, electronic book reader and a notebook.

2. Background

The computer industry is moving toward innovative solutions and more applications are being added utilizing unified platforms. Simplification and convenience are becoming the new tools for ease of use. Multifunction features are added to computing functions to increase productivity and ease of operational uses such as multimedia and conferencing. Students currently shuffle between multiple text books and Internet for research. Access to the internet became easier at home, Internet Hotspots (cafés) and by wireless carriers. Tablet has become a useful tool for applications including healthcare, industrial control, mobile point-of-sale, event self-registration, augmentative communication and home automation. Touch screen has become a new convenience tool for inputting and requesting data on handheld or mobile Smartphones.

The electronic book readers have become desirable to download books at everyone's convenience. Thus, adding a plurality of functions and capabilities in one simple and easy to use device is highly desirable. Therefore, it is an object of the present invention to provide a multi-screen laptop book, which enables a user to use this device in a plurality of ways, for example, as a tablet a typical notebook, or an electronic book reader. The use of this device includes, for example, storing multiple books, loading Student text books for all grades and submitting homework or tests online or other personal or commercial applications.

It is found that the development of the computers is now directed in facilitating the communication in addition to increasing functions and reducing the size to heightening the speed of the computers to transmit information more effectively. Hence, an integrated multi-screen laptop notebook is developed to meet the needs aimed at convenience of use and portability.

SUMMARY OF THE INVENTION

The present invention provides a device and a method for a multi-screen laptop book by integrating a plurality of features including a tablet, an electronic book reader, and a notebook. The multi-screen laptop book provides a capability in one simple and easy to use device. The integrated device utility includes applications in areas of education, healthcare, industrial control, mobile point-of-sale, event self-registration, augmentative communication, personal computing and word processing, multimedia home use and home automation.

In view of the foregoing, it is an object of the present invention to provide a plurality of features including a tablet, an electronic book reader, and a notebook in one device for convenience.

It is another objective of the present invention to provide a multi-screen laptop book with a resistive touch screen.

It is another objective of the present invention to provide a multi-screen laptop book with full handwriting recognition with a pen and a touch screen input.

It is another objective of the present invention to provide a multi-screen laptop book with a sunlight readable equally efficient both for indoors and outdoors use.

It is another objective of the present invention to provide a multi-screen laptop book with a vertical or horizontal display.

It is another objective of the present invention to provide a multi-screen laptop book with a tablet, an electronic book reader, or a notebook.

It is another objective of the present invention to provide a multi-screen laptop book where all text books are loaded and educational instruction are communicated wirelessly or by a wired connection.

It is another objective of the present invention to provide a multi-screen laptop book with a GPS (Global Positioning System) capability.

As discussed above, the newly disclosed device overcomes the disadvantages inherent in the prior art. It is to be understood that this disclosure is not limited in its details of construction. Also, it is to be understood that phraseology and terminology employed herein are for the purpose of description and should not be regarded as limiting.

Accordingly, those skilled in the art will appreciate that the concept upon which this invention is based may readily be utilized for the design of other devices for carrying out the purposes of this present invention. Therefore, it should also be realized by those skilled in the art that such equivalent constructions do not depart from the spirit and scope of the disclosure as set forth in the appended claims.

DETAILED DESCRIPTION OF THE DRAWINGS

The numerous innovative teachings of present application will be described with particular reference to presently preferred embodiments.

Figure 1:
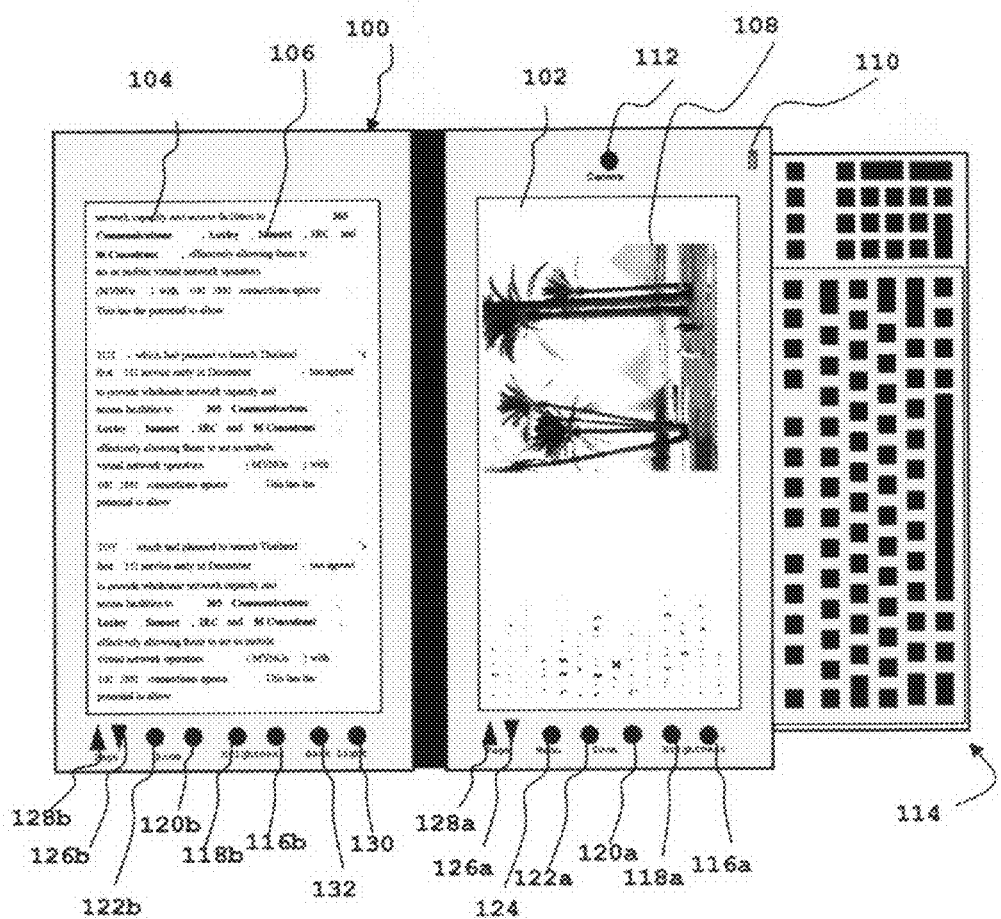
FIG. 1 is a comprehensive view of the multi-screen laptop book.

Referring to drawings, FIG. 1 shows a comprehensive view of the multi-screen laptop book 100. Multiple screen are shown in FIG. 1, for example, a first screen 102 shows an image 106 and a second screen 104 shows a text sample 108, an on-off switch 110, a camera 112, a sliding retractable keyboard 114, a pair of brightness controls 116a and 118a, a pair of zoom controls 120a and 122a, a menu control 124, and a pair of page down and page up controls 126a and 128a respectively. The second screen 104 shows a different set of controls such as a pair of brightness controls 116b and 118b, a pair of zoom controls 120b and 122b, a pair of page down and page up controls 126b and 128b, and a pair of back light controls switches 130 and 132. The applications for this invention are very broad. For example, the applications in the areas including education, healthcare, industrial control, mobile point-of-sale, event self-registration, augmentative communication, personal computing and word processing, multimedia home use and home automation. Further more, the multi-screen laptop book 100 utility includes various modes for the proceeding applications. For example, the multi-screen laptop book 100 may be used as a tablet, or an electronic book reader, or in a notebook mode. Note: The controls for multi-screens remain the same for all the figures in this document.

It is pointed out that multi-screen laptop book 100 is an integrated utility device and may be used for various applications. The image 106 and text sample 108 may be displayed on the first screen 102, or on the second screen 104, or on both screens 102 and 104 in various forms. The text sample 108 may be displayed in a horizontal, vertical or in columns form. The camera 112 of device 100 includes utilities, for example, as a security mechanism or for video conferences. This invention offers mobile convenience and operational flexibility with a light weight material "carry-everywhere" design. The dimensions are about 8.5"×11"×1" and the weight is about 3.5 lbs. The multi-screen laptop book 100 features resistive touch screens and active digitizers capability of supporting Digital Inking Technology and full handwriting recognition with a pen or touch screen input (dual mode input). Also the screens are sunlight readable so that it is equally efficient both for indoor and outdoor use. The dimensions for the multi-screen laptop book 100 screens are about 7.5"×10" and the display may be vertical or horizontal depending on a particular application or function. One of the features of this invention is that students may load all text books on the hard drive and all educational instructions may be communicated wirelessly or by a wired connection. A built-in wireless networking feature may utilize Bluetooth® and Wi-Fi (802.11b/g/n) and Mobile Broadband connectivity. A GPS capability is included to identify locations. Between Mobile Broadband triangulation and GPS the device may be tracked intelligently.

Figure 2:
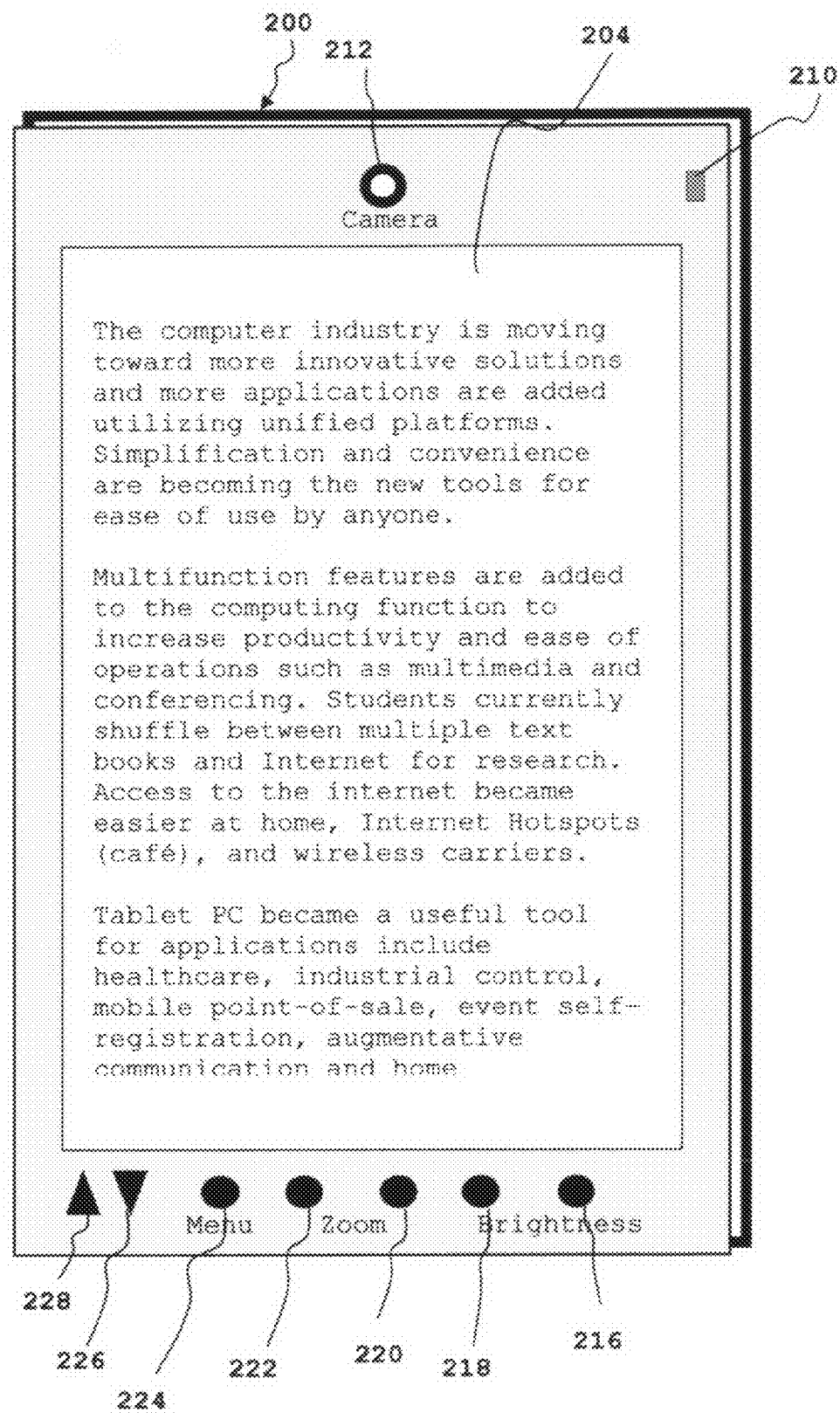
FIG. 2 shows a multi-screen laptop book as a tablet.
Figure 3:
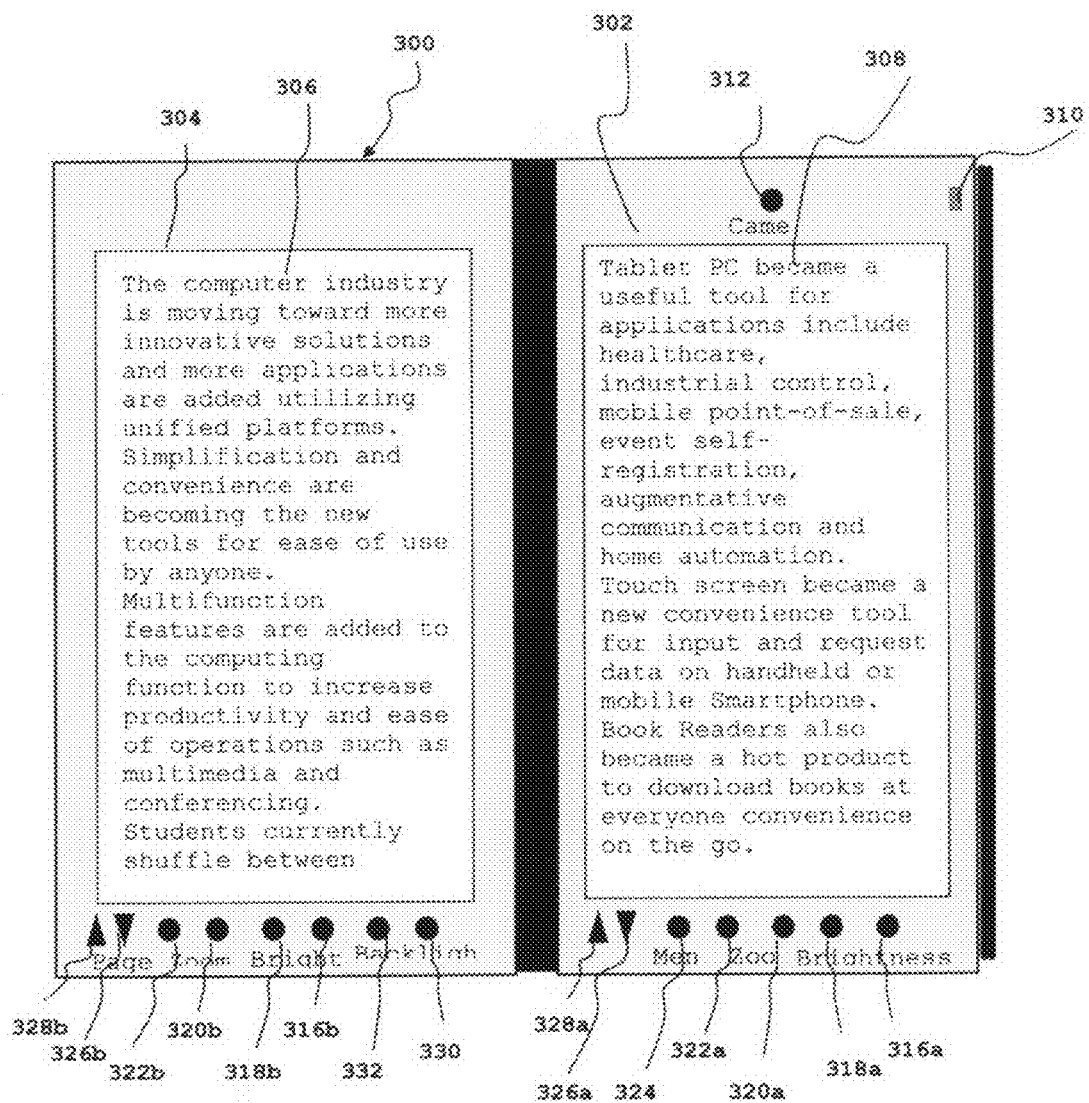
FIG. 3 shows a multi-screen laptop book as an electronic book reader.

FIG. 2 shows an embodiment of a multi-screen laptop book as a tablet 200. In FIG. 2, the screen 204 shows a text sample, an on-off switch 210, a camera 212, a pair of brightness controls 216 and 218, a pair of zoom controls 220 and 222, a menu control 224, and a pair of page down and page up controls 226 and 228. A multi-screen laptop book as a tablet 200 may include applications in education, healthcare, industrial control, mobile point-of-sale, event self-registration, augmentative communication, personal computing and word processing, multimedia home use, and home automation may utilize this invention. Also, video and audio conferencing application may be useful in workplace or at home. The video contents and audio contents may be downloaded to utilize the tablet 200 as a multimedia library for entertainment. This will enable users to listen to music and watch movies or retrieve contents. Additionally, live TV broadcasting may utilize multicast IPTV and MPEG-2 or MPEG-4 decoding for viewing favorite broadcasting, and similarly a radio broadcasting user may listen to live radio broadcasting. The media streaming also makes this device an excellent tool for viewing education materials such as broadcasting lectures, and facilitates distant learning. One of the features of this invention is that students may load all text books on the hard drive, and all educational instructions may be communicated wirelessly or by a wired connection Referring to drawings, FIG. 3 shows another embodiment of a multi-screen laptop book as an electronic book reader 300. As an electronic book reader 300, the display may be on both screens 304 and 306 in a vertical mode similar to a real book. The zoom function allows comfort reading and highlight text feature will allow reader to mark text and figures. Also reader can make handwritten notes which can be saved for future reference. Also, if needed hand jesters features may be implemented.

Figure 4:
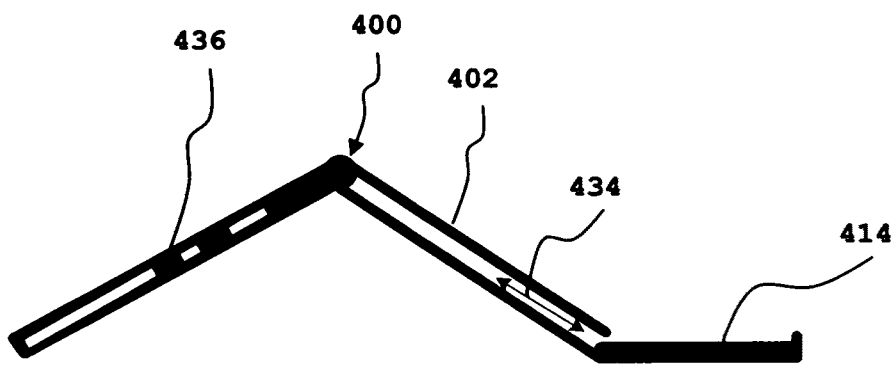
FIG. 4 shows a multi-screen flexibility of a notebook with adjustable angle for convenience. The retractable keyboard shows the keyboard in a pulled out position.

Referring to drawings, FIG. 4 shows a multi-screen flexibility of a notebook with an adjustable angle for convenience. The multi-screen notebook 400 shows the keyboard 414 in a pulled out position. The mechanism and operation of the multi-screen notebook 400 is illustrated by a screen 402, a retractable sliding keyboard 414, a keyboard retractable path 434, and interface ports 436.

Figure 5:
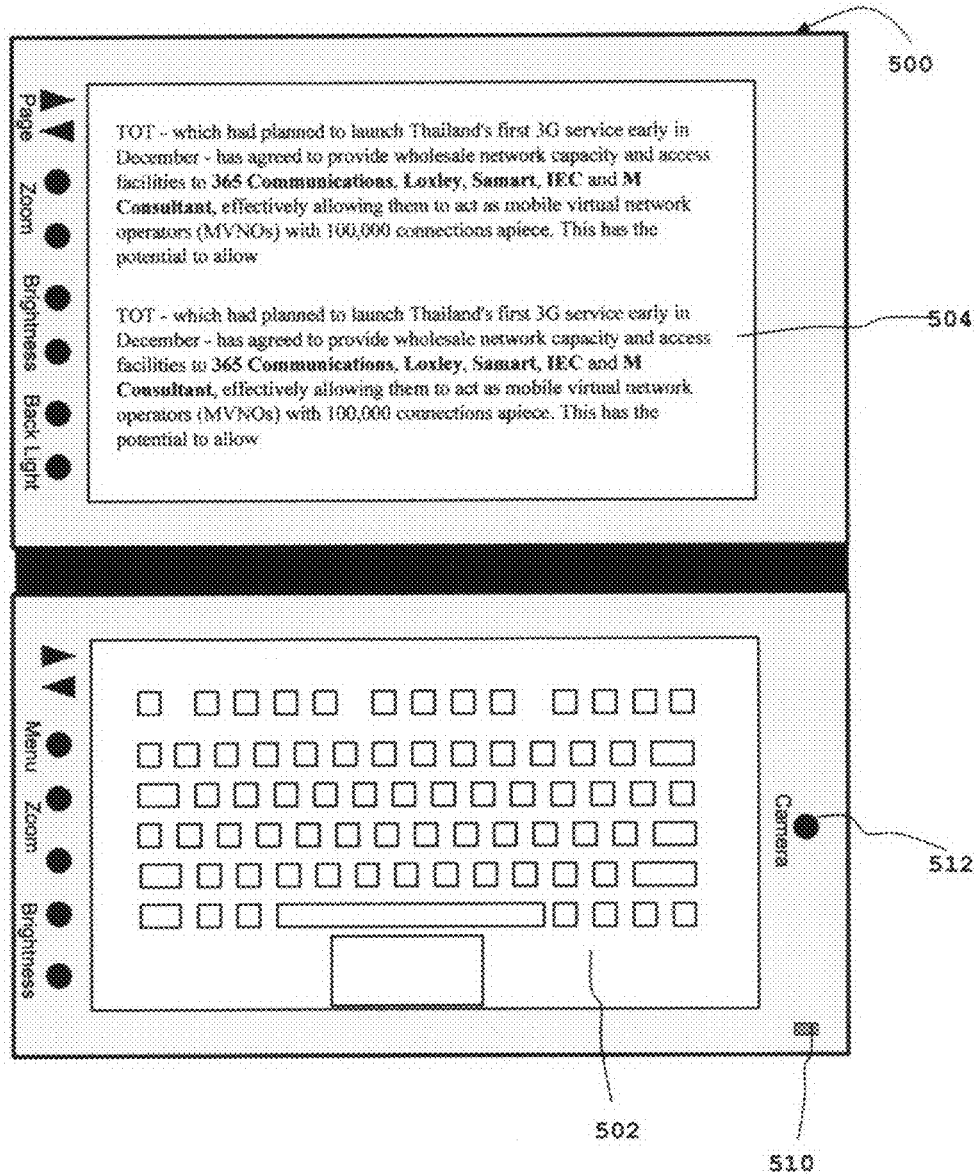
FIG. 5 shows a touch screen keyboard in a notebook mode.

Referring to drawings, FIG. 5 shows a touch screen keyboard 502 in a notebook mode set 500. A screen 504, from a multi-screen of the multi-screen laptop book 100 of FIG. 1, is illustrated with a text display. A user has the option to use the keyboard 502 in a touch screen manner.

Figure 6:
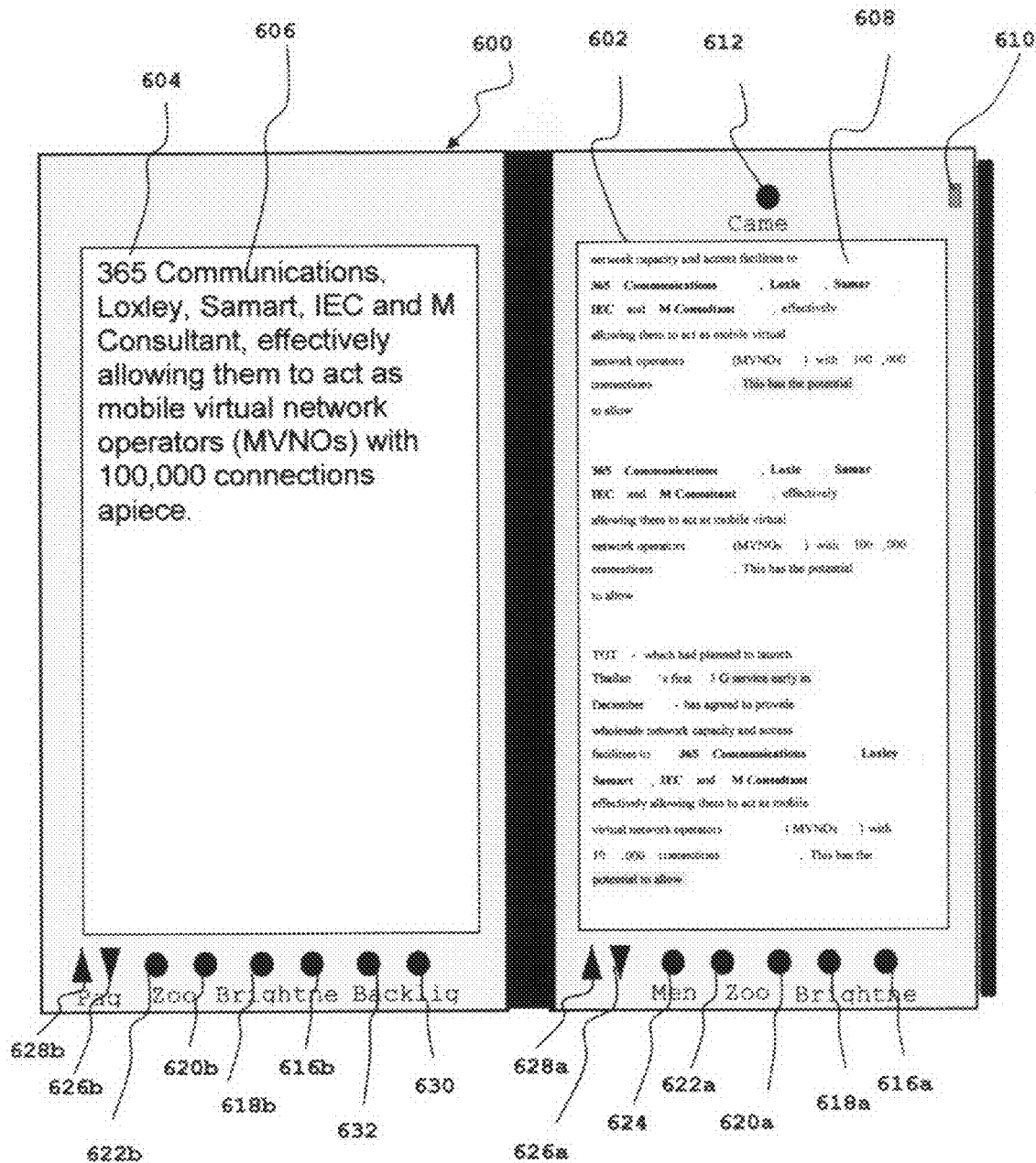
FIG. 6 depicts a zoom function on the left screen display and a highlight text feature on the right screen display.

Referring to drawings, FIG. 6 depicts a multi-screen laptop book 600 with another embodiment of a zoom function on a screen 604 displaying an example of a zoomed text 606, and a highlighted feature 608 on a screen 602.

Figure 7:
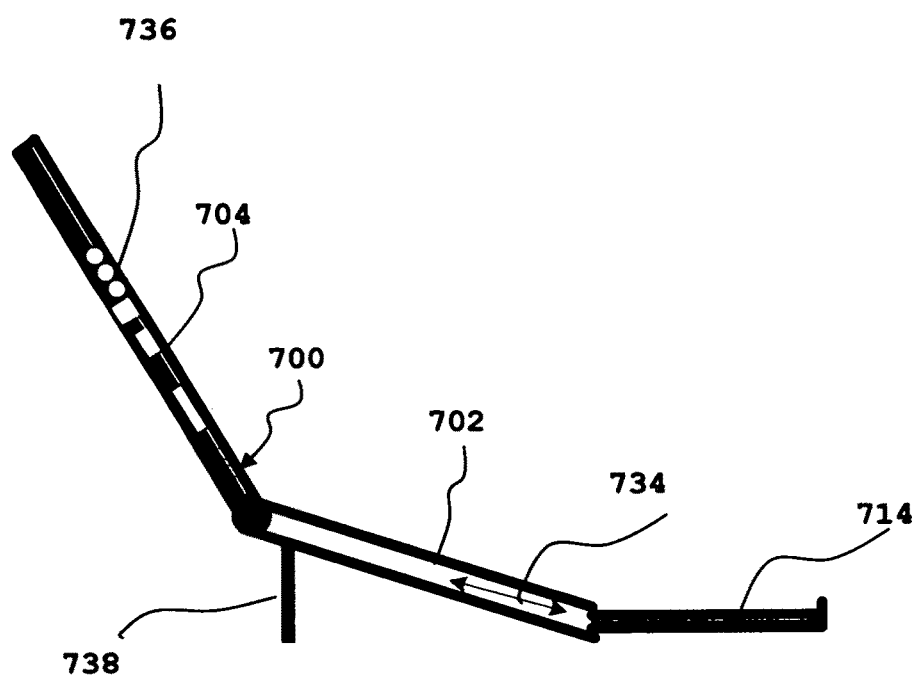
FIG. 7 depicts a note book configuration with multiple screens.

Referring to drawings, FIG. 7 depicts another embodiment of a notebook configuration with multiple screens 700. FIG. 7 illustrates a first screen 702, a second screen 704, a keyboard retractable path 734, a retractable sliding keyboard 714, a plurality of interface ports 736, and an adjustable support 738. The FIG. 7 illustrates the position flexibility of the laptop notebook as a notebook function utilizing multi screen display function.

I claim:

1. A multi-screen laptop book, which comprises:
   a plurality of folding display screens connected to the laptop book;
   a set of same or different controls provided on each of the plurality of folding display screens enabling the lap top book to display the same or a combination of different images on the plurality of folding display screens simultaneously;
   a retractable keyboard connected to the laptop book;
   a built-in camera;
   a plurality of stereo speakers;
   a dual digital microphone;
   a built-in wireless networking feature provided for internet remote access; and
   an internet port provided for internet connection for the laptop book.

2. The laptop book as recited in claim 1, wherein the laptop book has resistive touch screen capability.

3. The laptop book as recited in claim 1, wherein the laptop book has an active digitizer capable of supporting Digital Inking Technology.

4. The laptop book as recited in claim 1, wherein the plurality of folding display screens have handwriting recognition capability with a pen and a touch screen input.

5. The laptop book as recited in claim 1, wherein the plurality of folding display screens are sunlight readable and equally efficient for indoors and outdoors use.

6. The laptop book as recited in claim 1, wherein the set of same or different controls provided to each of the plurality of folding display screens enable the lap top book to display same or combination of different images simultaneously either in vertical or horizontal orientation.

7. The laptop book as recited in claim 1, wherein the laptop book is provided to perform functions which include a tablet, an electronic book reader, or a notebook.

8. The laptop book as recited in claim 1, wherein a reader is able to make handwritten notes, and wherein the handwritten notes are savable for future references.

9. The laptop book as recited in claim 1, wherein the laptop book is provided with built-in wireless networking features, and wherein the built-in wireless networking features include Bluetooth, Wi-Fi, and mobile broadband connectivity.

10. The laptop book as recited in claim 1, wherein the lap top book is operable either wirelessly, or in a wired mode.

11. The laptop book as recited in claim 1, wherein the laptop book is provided with GPS capability to identify global locations.

* * * * *